United States Patent
Zhu et al.

(10) Patent No.: US 10,042,863 B2
(45) Date of Patent: Aug. 7, 2018

(54) AUTOMATIC UPDATE FOR MAP CACHE

(71) Applicant: ORACLE INTERNATIONAL CORPORATION, Redwood Shores, CA (US)

(72) Inventors: Honglei Zhu, Shrewsbury, MA (US); Liujian Qian, Lancaster, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 399 days.

(21) Appl. No.: 14/288,460

(22) Filed: May 28, 2014

(65) Prior Publication Data
US 2015/0347457 A1 Dec. 3, 2015

(51) Int. Cl.
G06F 17/30 (2006.01)
G01C 21/32 (2006.01)

(52) U.S. Cl.
CPC ....... *G06F 17/30241* (2013.01); *G01C 21/32* (2013.01); *G06F 17/3048* (2013.01); *G06F 17/30339* (2013.01); *G06F 17/30345* (2013.01); *G06F 17/30864* (2013.01)

(58) Field of Classification Search
CPC ......... G06F 17/30241; G06F 17/30339; G06F 17/30345; G06F 17/3048; G06F 17/30864; G01C 21/32
See application file for complete search history.

(56) References Cited

U.S. PATENT DOCUMENTS

| | | | | |
|---|---|---|---|---|
| 2007/0229490 A1* | 10/2007 | Boudreau | ............... | G01C 21/32 345/418 |
| 2008/0249705 A1* | 10/2008 | Matsuda | ................ | G01C 21/32 701/532 |
| 2010/0231600 A1* | 9/2010 | Kaufman | ............... | G09G 5/393 345/545 |
| 2012/0239886 A1* | 9/2012 | Rantanen | .......... | G06F 17/30578 711/147 |

FOREIGN PATENT DOCUMENTS

WO WO 2010111646 A2 * 9/2010 ....... G06F 17/30241

OTHER PUBLICATIONS

Lei Fang et al., A New Dynamic Tile Caching Method for WebGIS, Nov. 11, 2010, IEEE, pp. 1-4.*

* cited by examiner

*Primary Examiner* — Augustine K Obisesan
*Assistant Examiner* — Lahcen Ennaji
(74) *Attorney, Agent, or Firm* — Cooper Legal Group, LLC (57) ABSTRACT

Systems, methods, and other embodiments associated with automatically updating a map cache are described. In one embodiment, a method includes detecting a modification to a spatial database record having a geometry attribute and recording, in a log table, an identifier for the record that was modified. The method includes periodically accessing the log table to identify map tiles that include at least one geometry of records that have been modified and periodi- (Continued)

cally generating the identified map tiles. The generated map tiles are stored in a map cache.

20 Claims, 9 Drawing Sheets

AUTOMATIC UPDATE FOR MAP CACHE

BACKGROUND

Spatial databases provide clients with the capability to view their data in two-dimensional map form. Spatial database tables can include columns of "geometry" data that describes a geographic location or feature. Non geometry data is also stored in spatial database tables. For example, a bank may utilize a customer table that stores non geometry data such as names and account information for its customers, as well as geometry data such as the customers' home addresses. Thus, each record in the customer table includes a geometry type attribute (e.g., the address) along with non-geometry type attributes. When bank personnel access the data they can choose to view the data as a map that shows where the customers live. In this map view, each customer residence is labeled with the non-geometric data (e.g., name, account information). The user can navigate through the map view by panning and zooming.

Map views are assembled from multiple adjacent map tiles, with each map tile covering a given area defined by a minimum bounding rectangle (MBR) associated with the map tile. A map tile is generated from a collection of data layers. Each layer is stored in a spatial database table. In each table, there may be a geometry column storing data for a geometry attribute and a few other columns storing other attributes. The geometry column stores a "geometry", which can be a point, a line, a polygon feature, or a collection of points, lines, and/or polygons. For example, for a "customers" layer, a customers data table may contain records that include a customer's name, bank account information, and the customer's address stored in a geometry column as a point having an (x,y) coordinate. For a "streets" layer, a streets data table may contain records that include a street name, the street's width, the street pavement materials, and the street geometry stored in a geometry column as a collection of (x,y) coordinates. A map tile that renders the customer's data will overlay a customer layer that positions an icon for the customer at location corresponding to the x,y coordinate for the customer's address on top of a street layer that depicts the customer's street.

Note that in the above example, only the customer table contains data that is generated and maintained by the bank. A client wishing to have mapping capabilities may subscribe to a mapping database service that maintains the street data table, as well as other tables that store "public" data for geographic features, commercial establishments, residences, and so on. Examples of these mapping databases include NavTeq and TomTom. When a map tile is generated, layers for tables from the mapping database as well as the client's database are generated and included in the map tile.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

User interface applications, such as web applications, often use a browser to display a map image for an area of interest. The map image is made up of a collection of adjacent map tiles that render geographic data in two dimensions. A map server provides map tiles upon a client request. Because generating map tiles from scratch on the map server side is computationally intensive, commonly requested map tiles are normally pre-generated and saved in the map server's map cache. When a client requests a map tile, the map server retrieves the map tile from the map cache and sends it back to the client. If a requested map tile is not available in the map cache, it is then generated, provided to the client, and saved in the map cache for future requests.

It is common practice that frequently requested map tiles (tiles with small scales and less detail, such as a map tile that contains a whole country, a whole state, or a whole city) are pre-generated. Other less frequently requested map tiles are generated upon first request and then cached. Once a map tile is cached, it can be quickly retrieved by the map server and returned to a requesting client.

While caching map tiles greatly improves the response time to requests for map tiles, map caches require maintenance. When the original data set used to generate a cached map tile is modified, the cached map tile becomes outdated or "dirty". Note that even when non-geometry data in a record is changed, the map tile must be updated because the non-geometry data in a record is also presented on the map in the form of text labels or icon shapes.

To maintain the accuracy of the data presented to a requesting client, dirty map tiles should be deleted from the cache, re-generated using up-to-date data, and stored in the cache. Of course, updating map cache tiles is computationally intensive and the benefits of frequent updates must be weighed against the resources needed to re-generate map tiles.

Some existing map caches perform a periodic update (e.g., weekly, semi-annually) of all cached map tiles. At a scheduled time, all map tiles are deleted from the cache. Frequently requested map tiles (e.g, small scale map tiles) are generated and stored in the cache and other map tiles are simply deleted from the cache to be re-generated in response to a first request. This periodic approach has several drawbacks. Before a scheduled update, some cached map tiles are outdated and are still being returned to clients. When the cache is updated, all map tiles are deleted from the cache including up-to-date map tiles as well as dirty tiles. Often, the majority of map tiles in a cache are still up-to-date. Regenerating map tiles that were already up-to-date is time consuming and a waste of system resources. Regeneration of all map tiles in a typical map cache takes hours and sometimes even days.

Some map caches are manually updated by a skilled operator, often the person who modifies the spatial data set. The operator manually identifies each record (e.g., a customer record) that has been modified and then identifies a geometry that is part of the record (e.g, customer address). The operator then determines the geographic area that includes the geometry, and invokes a tile deletion and regeneration process for map tiles that render the geographic area. Manual updates are feasible only when a few features have been modified and are not practical for data that is frequently modified or that includes a large number of geographic features. Further, manual updates rely on humans, introducing the possibility of errors.

Some map caches employ a hybrid approach to updating cached map tiles. Additional programs are provided that perform the following three tasks. First, an original data set that was used to generate the cached map tiles is compared to a latest version of the data set and modified records are identified. Second, dirty map tiles that render the modified records are identified and deleted from the cache. The dirty map tiles are re-generated using a staging map server. Third, the updated tiles are copied from the staging map server to the map cache. Errors can be introduced in all three approaches, especially when there are multiple data sets from which data rendered by map tiles is drawn. Further, the existing approaches allow outdated map tiles to remain in the cache until the update operation, which is time consuming thus not easy to perform often, is executed.

Systems and methods are described herein that provide automatic updates to a map cache. Triggers inherent to a spatial database are used to automatically log modifications to records in a log table. Background processes periodically check the log table to identify dirty map tiles and to update and re-cache the identified map tiles. Because the log table is updated in real time, map tile identification and updating can be performed, possibly piecemeal, by the background processes whenever resources are available. This facilitates keeping cached map tiles up to date without requiring human interaction, a separate staging map server, or unnecessary re-generation of up-to-date map tiles.

Figure 1:
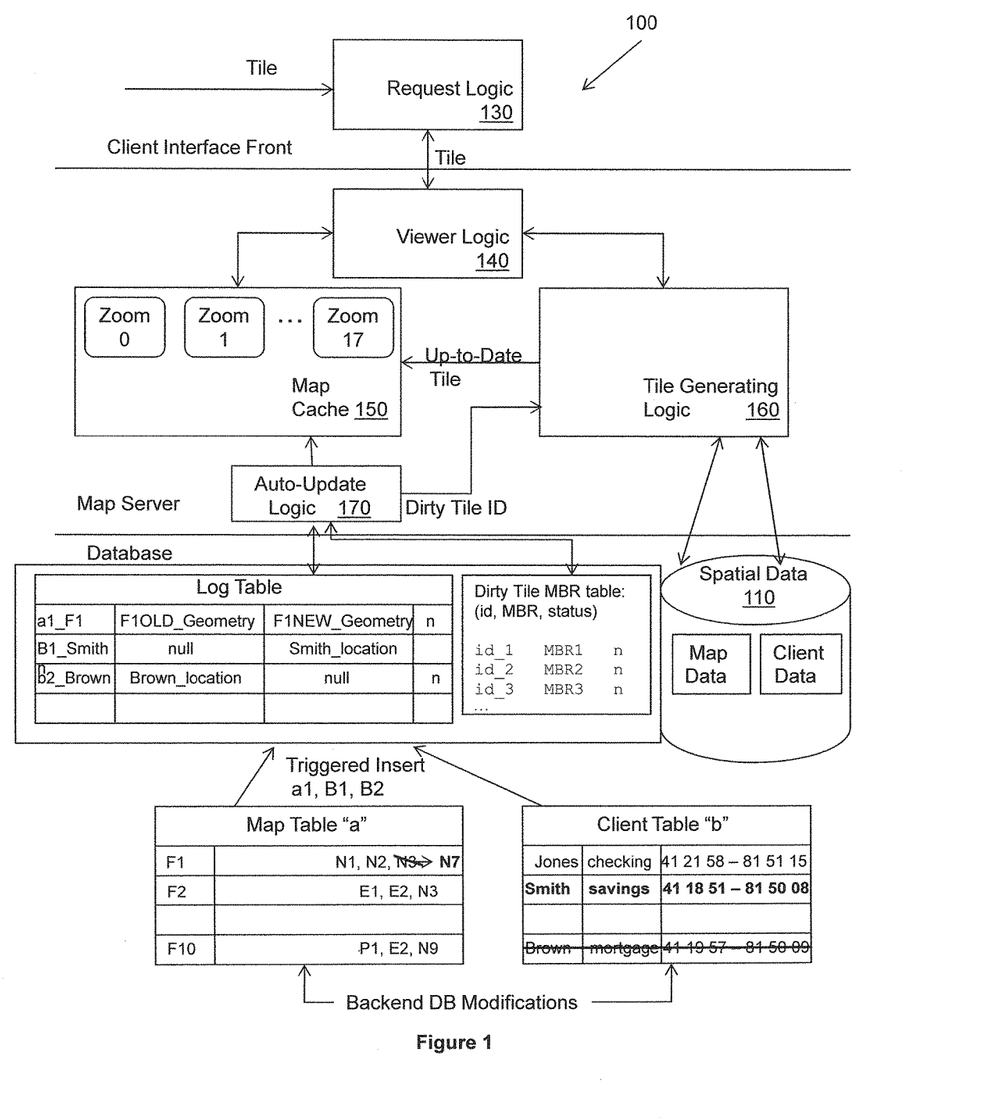
FIG. 1 illustrates one embodiment of a map display system that includes a map cache that is automatically updated.

FIG. 1 illustrates one embodiment of a map display system 100 that includes a map cache 150 that is automatically updated. The system 100 spans three computing environments, a client interface front environment, a map server environment, and a database environment. The various environments may be physically implemented on computing components in separate locations. For example, the client interface front may include a web browser that accesses components and data in the map server environment via the Internet. Components in the map server environment may access components and data in the database environment by way of a Java Database Connectivity (JDBC) API.

The map cache 150 stores map tiles grouped according to zoom level. Higher zoom levels correspond to map tiles that cover a smaller geographic area. For example, in some mapping systems, at zoom level 0 one map tile encompasses the entire earth while at zoom level 19 one map tile covers an area of one or two houses. A different "folder" of map tiles in the map cache is accessed by the viewer logic 140, depending on the zoom level selected by the client.

The map display system 100 is configured to display map tiles corresponding to two dimensional renderings of records stored in a spatial database 110. As discussed above, in one embodiment, the spatial database 110 includes client data tables as well as map data tables that are maintained by a mapping service. The system includes a request logic 130 that is configured to receive a request for one or more map tiles from a client. The request logic 130 may be configured to convert a client keyboard or mouse input (e.g., zoom or pan input) into one or more map tiles that are being requested by the client.

The request logic 130 transmits a request for the map tiles to a view logic 140 in the map server. The viewer logic 140 is configured to check a map cache 150 for the requested map tiles and, when the requested map tiles are stored in the cache, to return the requested map tiles to the request logic 130. When a requested map tile is not stored in the map cache 150, the viewer logic 140 is configured to cause a tile generating logic 160 to generate the map tile. The viewer logic 140 returns the generated map tile to the request logic. The generated map tile is also stored in the map cache 150 for use in responding to future requests.

The map cache is automatically updated. To provide the automatic map cache update, a log table is maintained that records modifications to records in the database 110 as the modifications occur. An auto-update logic 170 accesses the log table to identify dirty map tiles and calls on the tile generating logic 160 to re-generate the identified map tiles. The identifying and updating functions of the auto-update logic may be performed by background processes, such as daemon threads, running on the map server.

FIG. 1 illustrates an example of how the map cache 150 can be automatically updated to reflect changes to records in the database 110. Two example database tables, a map table "a" (e.g, a table maintained by a mapping service) and a client table "b" (e.g., a table maintained by the client) are shown. The client table b includes customer names, account types, and longitude and latitude coordinates for the customer's address. Triggers are created on table a and table b that will store old and new versions of the geometry columns of any record that is updated, deleted, or inserted (for simplicity, the term "modify" will be used in this description to encompass any and all of these operations).

A geographic feature F1 stored in the map table a, which originally included points N1, N2, and N3 is modified so that F1 now includes points N1, N2, and N7. The trigger on table a causes the following data to be stored in the log table: a record identifier (a1_F1, which identifies a unique modification to the table and the record), the old version of the geometry F1, and the new version of the geometry F1. A status column stores the value n when the log table record is first written. A new customer Smith is inserted into table b. The trigger on table b causes the geometry column of the table which stores the location (longitude and latitude coordinates) for Smith to be recorded in the log table. Since Smith is a new record, the old version of Smith's location has a value of null. Customer Brown switches banks and is deleted from the client table b. The trigger on table b causes the geometry column of the table which stores the location (longitude and latitude coordinates) for Brown to be recorded in the log table. Since Brown was deleted, the new version of Brown's location has a value of null.

As will be described in more detail below, the auto-update logic 170 accesses the log table to determine which map tiles include geometries of modified records, and insert the dirty tiles' minimum bounding rectangles (MBRs) into the dirty MBR table, which will be used by the tile generating logic 160 so that the dirty map tiles can be updated and stored in the map cache. The auto-update logic 170 can perform the identification of dirty map tiles and the updating of dirty map tiles in the background of normal map server operation.

Figure 2:
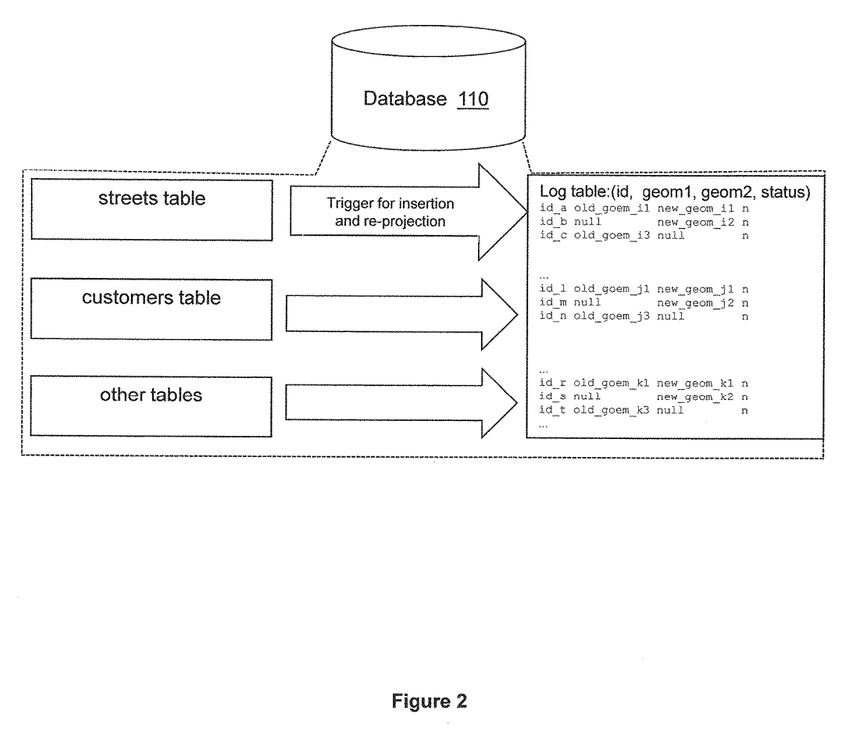
FIG. 2 illustrates how database triggers can be used to populate a log table.

FIG. 2 illustrates an example of how, in one embodiment, triggers on database tables populate the log table. The following SQL command line is received:

```
UPDATE streets SET st_geom=new_geom_i1 WHRE st_name=
   'abc' AND...;
   COMMIT;
```

The data for street abc is changed in the streets table. The table's trigger is invoked to insert a row into the log table, as shown in FIG. 2, containing both the old geometry for street abc and the new geometry for street abc:

id_1 old_geom_i1 new_geom_i1 n

The log table has four columns, an identifier column, an old geometry column, a new geometry column, and a process status column. The process status column can have a value of n for not processed, "p" for under process, and "y" for processed. When the database's trigger logs the affected rows, if the geometries in the data table have a different map projection than that of the map tile's protection, a spatial database function is called to complete the transformation within the database. Because in this embodiment, the trigger is created for the data tables, the log data insertion and geometry re-projection can be done within the database, which is very efficient.

For an insert operation, the following SQL command line is received:

```
INSERT INTO streets (val1,val2, ..., geom) VALUES(attr_j1,
attr_j2, ..., new_geom_j2); ....
   COMMIT;
```

The data is inserted in the streets table. The table's trigger is invoked to insert a row into the log table, as shown in FIG. 2, containing the new geometry in the streets table, the old geometry value is set to null:

id_2 null new_geom_j1 n

For a delete operation, the following SQL command line is received:

```
DELETE FROM streets WHERE st_name='xyz'   AND . . .;
   COMMIT;
```

The data for street xyz is deleted from the streets table. The table's trigger is invoked to insert a row into the log table, as shown in FIG. 2, reflecting the deletion of the feature, the old geometry is recorded and the new geometry is set to null:

id_3 old_geom_k3 null n

Similarly, triggers for the customers data table and other data tables that support map viewing log geometries for modified records. In this manner, geometries of records that are modified are recorded in real time in the log table.

Figure 3:
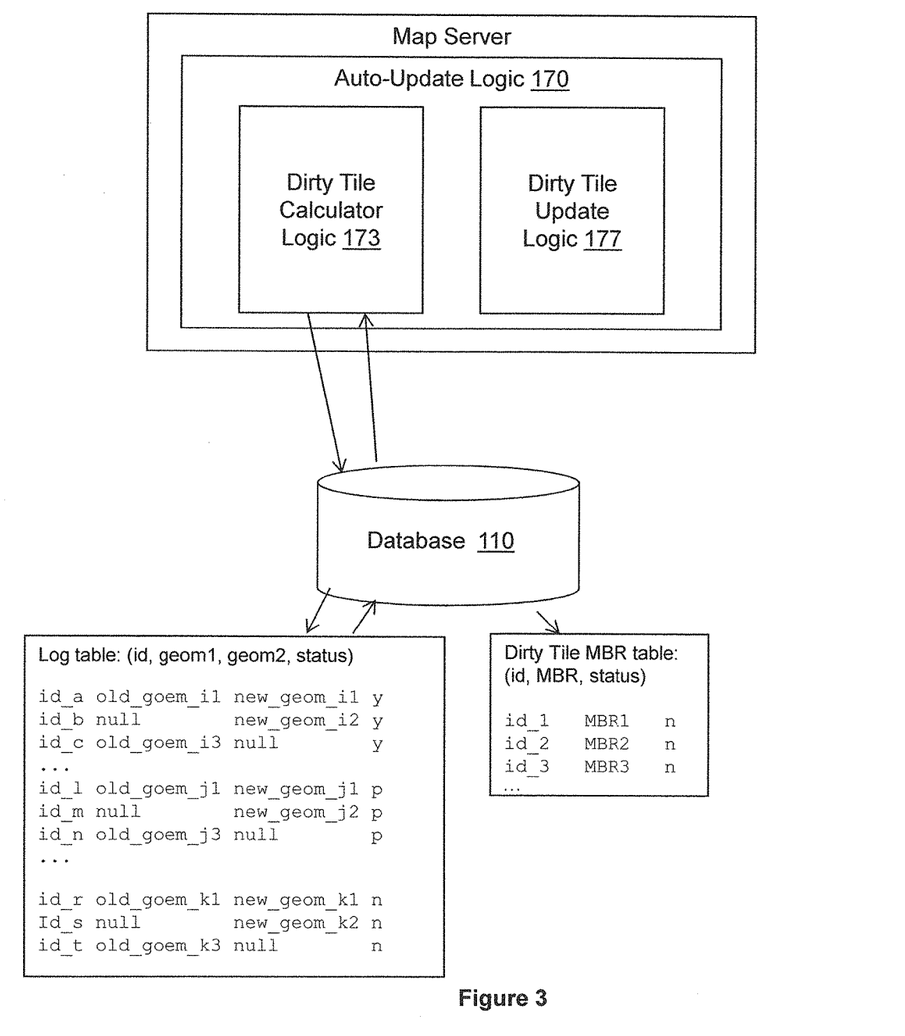
FIG. 3 illustrates operation of one embodiment of a dirty tile calculator logic identifying dirty map tiles.

FIG. 3 illustrates operation of one embodiment of the update logic 170 that includes a dirty tile calculator logic 173 and a dirty tile update logic 177. In one embodiment, the dirty tile calculator logic 173 and the dirty tile update logic 177 are each a daemon thread in the map server that works as a background process. The dirty tile calculator thread periodically identifies dirty map tiles. The dirty tile update thread periodically updates the dirty map tiles in the cache. The dirty tile calculator logic 173 identifies dirty tiles and inserts each dirty tile's MBR in a dirty MBR table. As will be described in more detail with respect to FIG. 5, the dirty tile update logic 177 checks the dirty tile MBR table, retrieves dirty tiles corresponding to the MBRs in the table, and causes the tiles to be re-generated by other components in the map server (e.g., tile generating logic 160).

The dirty tile calculator logic 173 periodically connects to the database 110 to retrieve geometries from the log table. In one embodiment, the dirty tile calculator logic 173 is a daemon thread that connects to the database 110 via JDBC and retrieves geometries in the log table. Once a geometry has been retrieved, the dirty tile calculator logic 173 changes the status for the geometry's record in the log table to p. The dirty tile calculator logic 173 may be configured to retrieve some predetermined number of geometries from the log table whenever processing resources become available. Thus, the dirty tile calculator logic 173 may not always retrieve all geometries in the log table. The dirty tile calculator logic 173 analyzes the geometries to determine which map tiles include the geometries and thus are "dirty" map tiles.

Figure 4A:
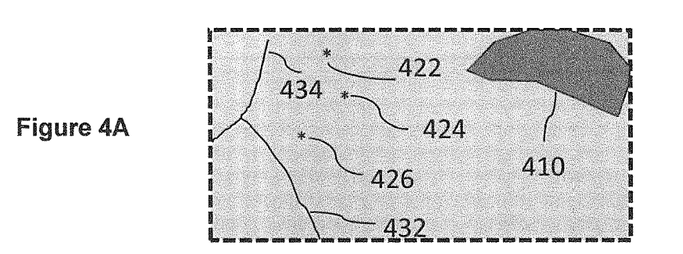
FIGS. 4A-4D illustrate operation of one embodiment of a dirty tile calculator logic identifying dirty map tiles in different zoom levels.
Figure 4B:
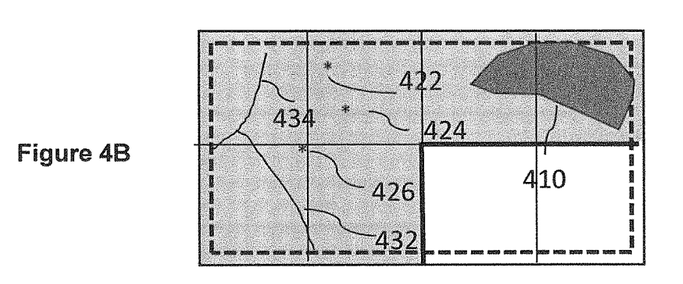
Figure 4C:
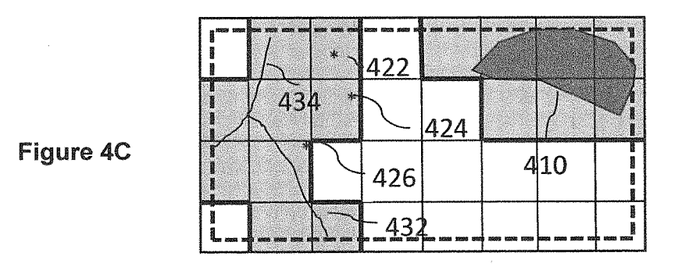
Figure 4D:
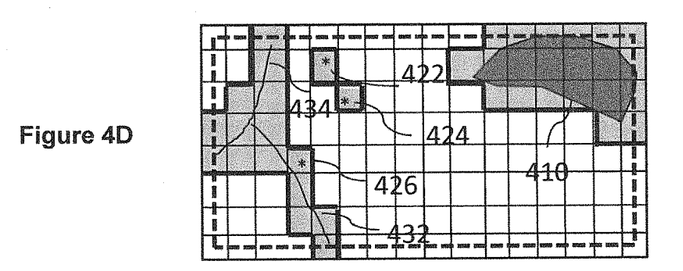

FIGS. 4A-4D illustrate an example of operation of one embodiment of the dirty tile calculator logic 173 identifying dirty map tiles in various zoom levels. FIG. 4B illustrates a "lowest" zoom level that is cached (e.g, zoom level 0 in FIG. 1), and FIGS. 4C-4D illustrate increasing zoom levels (e.g., zoom levels 1-2 in the map cache of FIG. 1). Often, a map cache administrator selects which zoom levels are to be cached, depending on the anticipated usage patterns for map data. In the example shown in FIGS. 4A-4D, six geometries are retrieved from the log table, a pond 410, three residences 422, 424, 426, and two streets 432, 434. Recall that the geometries may be modified, newly inserted, newly deleted, or simply part of a record that had some other change that affects the appearance of the map tile (e.g., a change in text for a label or a change that affects an icon).

The dirty tile calculator logic 173 accesses the database to determine a smallest MBR that contains all of the geometries. FIG. 4A illustrates a smallest MBR that includes all six geometries retrieved from the log table, which will be referred to as the "base" MBR. The dirty tile calculator logic 173 starts with a lowest cached zoom level (e.g., the zoom level with the least detail that includes the map tiles having the largest area-zoom level 0 in FIG. 1). As shown in FIG. 4B, at the lowest zoom level, the base MBR intersects eight map tiles, six of which include at least one of the geometries. An MBR for each of the six map tiles is written into the dirty MBR table. As shown in FIG. 4C, at the next highest zoom level, the base MBR intersects 32 map tiles, 16 of which include at least one of the geometries. An MBR for each of the 16 map tiles is written into the dirty MBR table. As shown in FIG. 4D, at the next highest zoom level, the base MBR intersects 128 map tiles, 34 of which include at least one of the geometries. An MBR for each of the 34 map tiles is written into the dirty MBR table.

The process of identifying dirty map tiles may continue until all cached zoom levels have been reached, or until some predetermined maximum number of dirty map tiles has been identified. Once the dirty tile calculator logic 173 has identified the map tiles for a set of geometries retrieved from the log table and stored the MBRs for the map tiles in the dirty MBR table, the dirty tile calculator logic 173 changes the status for the geometries in the log table to p from y. An example dirty tile MBR table is shown in FIG. 3 and includes an identifier column, an MBR column, and a status column.

Figure 5:
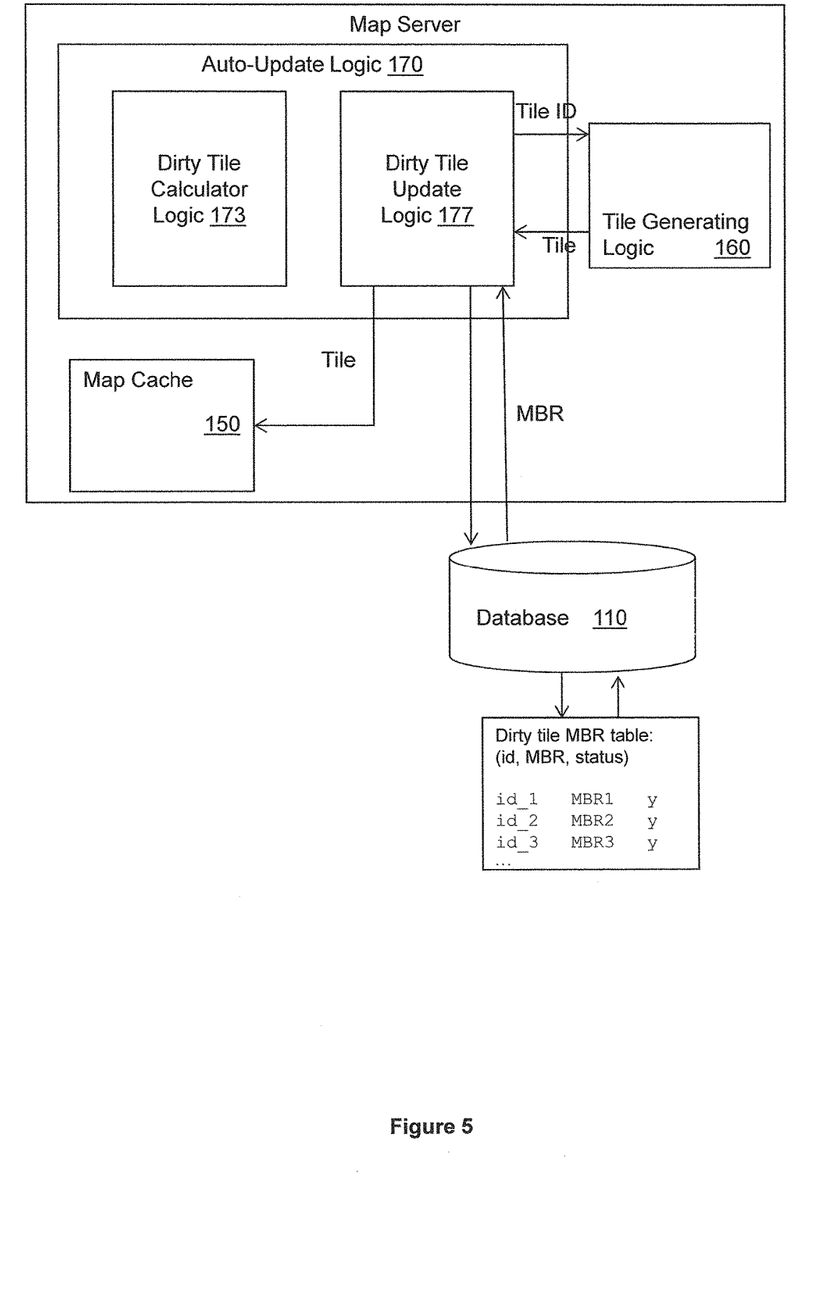
FIG. 5 illustrates operation of one embodiment of a dirty tile update logic updating dirty map tiles.

FIG. 5 illustrates operation of one embodiment of the dirty tile update logic 177. The dirty tile update logic 177 periodically updates the dirty map tiles in the cache. The dirty tile update logic 177 periodically connects to the database 110 to retrieve dirty tile MBRs from the dirty tile MBR table. In one embodiment, the dirty tile update logic 177 is a daemon thread that connects to the database 110 via JDBC and retrieves MBRs in the dirty tile MBR table. Once an MBR has been retrieved, the dirty tile update logic 177 changes the status for the MBR's record in the dirty tile MBR table from n to p. The dirty tile update logic 177 may be configured to retrieve some predetermined number of MBRs from the dirty tile MBR table whenever processing resources become available. Thus, the dirty tile update logic 177 may not always retrieve all MBRs in the dirty tile MBR table.

For each retrieved MBR, the dirty tile update logic 177 calls on the map server (e.g., the tile generating logic) to re-generate the corresponding map tile and store the map tile in the cache. Once a map tile for an MBR in the dirty tile MBR table has been re-generated, the status for the MBR in the dirty tile MBR table is changed from p to y. In this manner, dirty map tiles in the cache can be updated as time permits, thereby continuously, frequently, and automatically refreshing the map cache.

Figure 6:
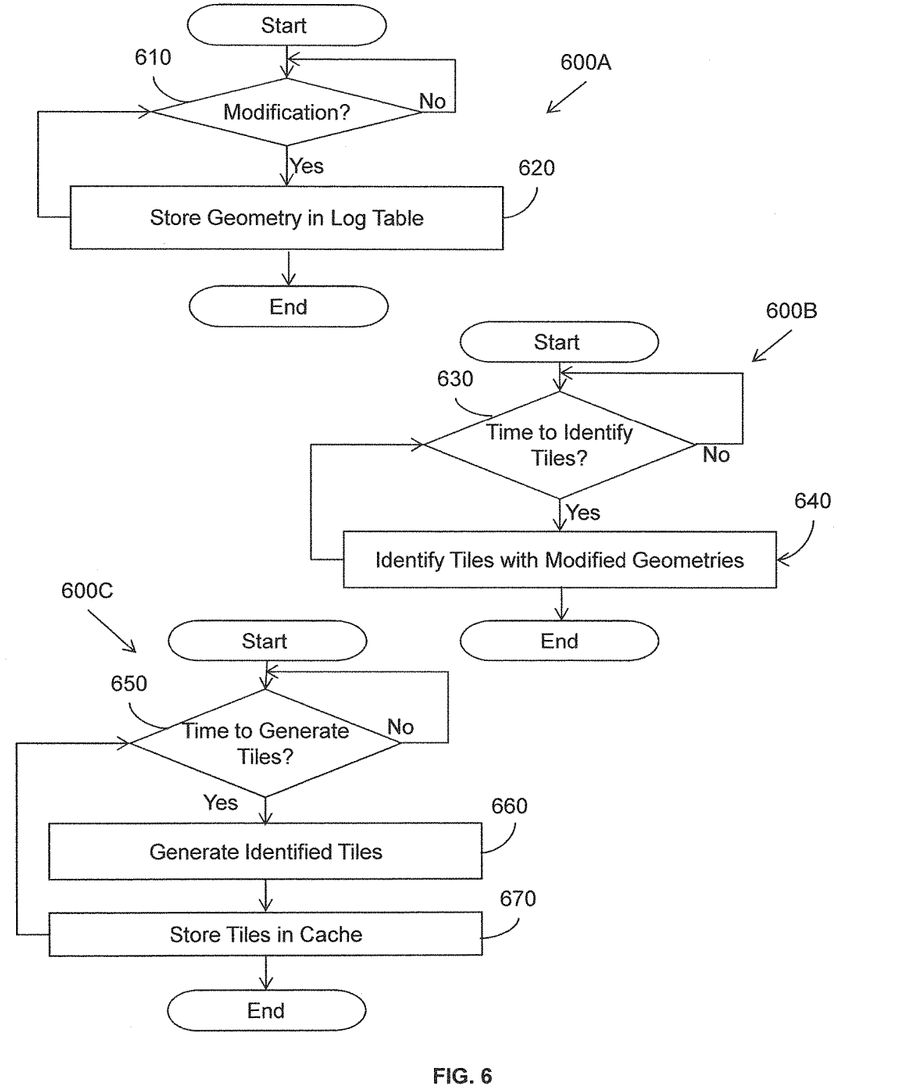
FIG. 6 illustrates one embodiment of three independent methods that cooperate to automatically update a map cache.

FIG. 6 illustrates one embodiment of a method for automatically updating a map cache. The method includes three independent methods 600A, 600B, and 600C. In 600A, geometries that are part of modified spatial database records are logged in a log table. At 610, a determination is made as to whether any record has been modified. When a modification is made, at 620, the geometry is stored in the log table. In one embodiment, an old version of the geometry and a new version of the geometry are stored in the log table. This enables geometries that have been deleted or modified to be removed from map tiles that should no longer include them. In one embodiment, the method 600A is performed using spatial database triggers that automatically populate the log table in response to executing an UPDATE, DELETE, or INSERT operation.

Figure 7:
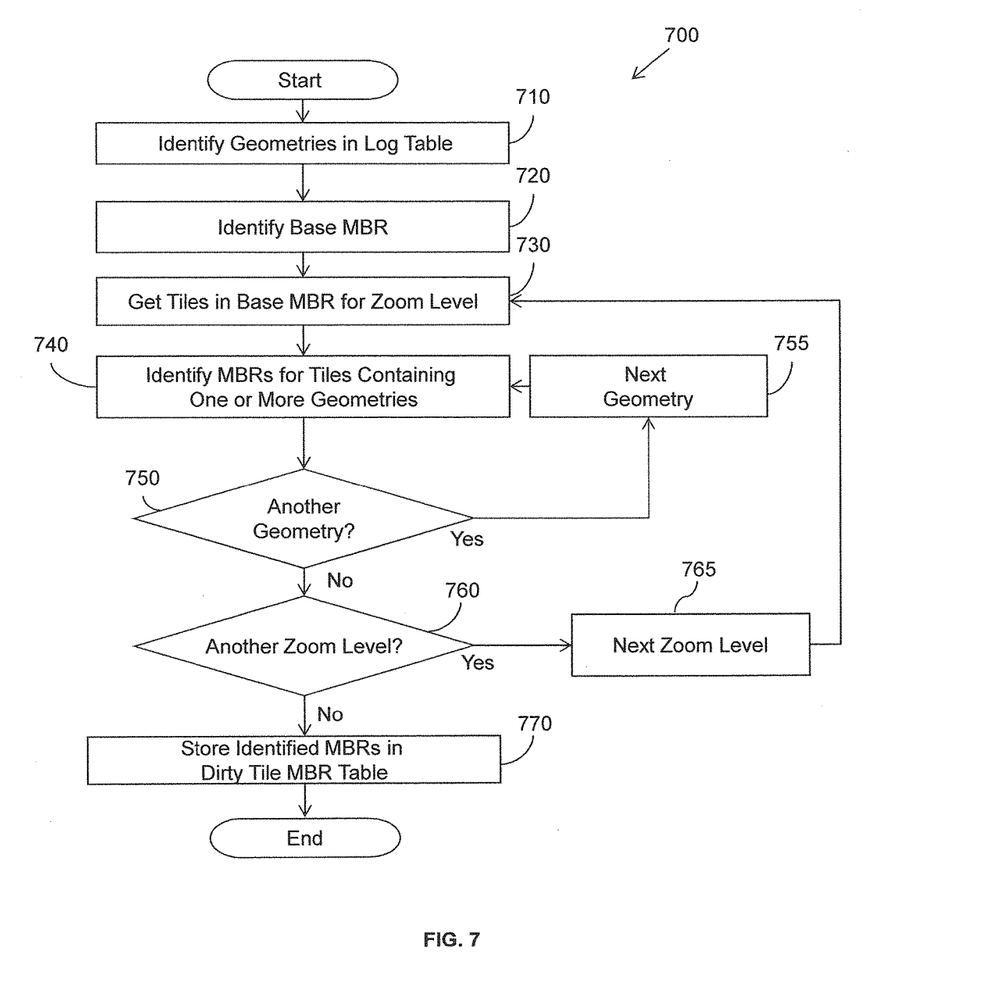
FIG. 7 illustrates one embodiment of a method for identifying dirty map tiles.

The method 600B includes, at 630, determining if it is time to identify dirty map tiles that need updating. When it is time to identify dirty map tiles, at 640, dirty map tiles are identified. The map tile identification at 640 can be automatically periodically performed according to a specified time period selected by a map server administrator, or any other criteria. In one embodiment, the method 600B is performed by the dirty tile calculator logic 173 of FIGS. 3 and 5. The method 600B may be performed by a daemon thread on a map server. It can be seen that the method 600B is performed independently of the method 600A, and can thus be performed according to any schedule selected by a map server administrator. FIG. 7 illustrates how one particular embodiment of the method 600B can be performed.

Figure 8:
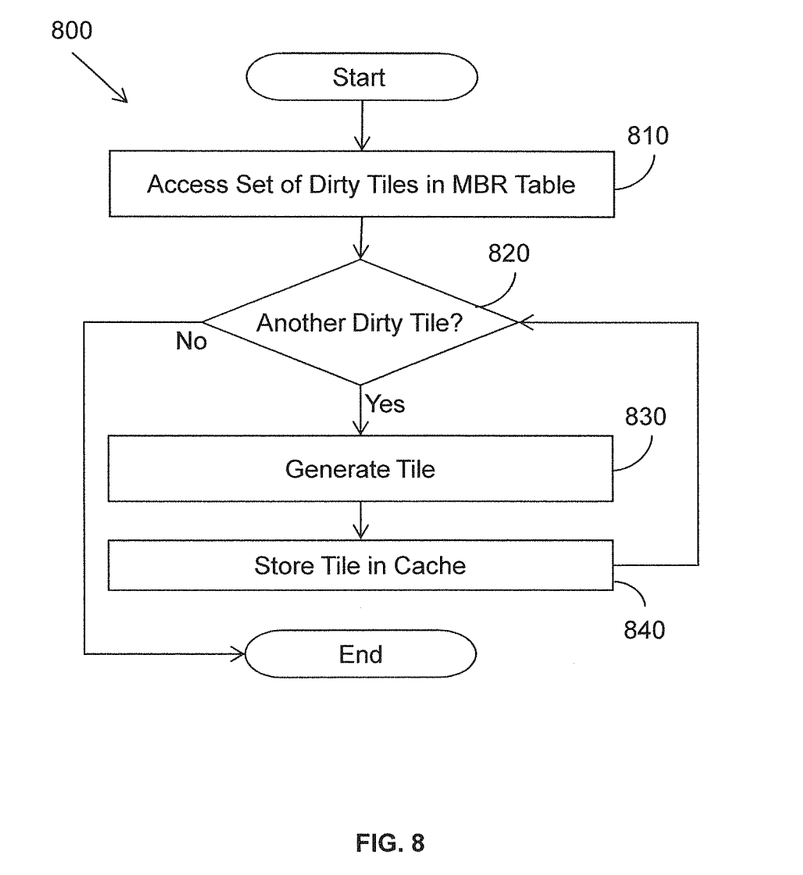
FIG. 8 illustrates one embodiment of a method for updating dirty map tiles.

The method 600C includes, at 650, determining if it is time to generate map tiles. When it is time to generate map tiles, at 660, map tiles identified as dirty are generated and at 670, the generated map tiles are stored in a cache. The tile generation at 660 can be automatically periodically performed according to a specified time period selected by a map server administrator, or any other criteria. In one embodiment, the method 600C is performed by the dirty tile update logic 177 of FIGS. 3 and 5. The method 600C may be performed by a daemon thread on a map server. It can be seen that the method 600C is performed independently of the method 600A and the method 600B and can thus be performed according to any schedule selected by a map server administrator. In one embodiment, the method 600C includes determining whether a dirty tile is present in the cache prior to re-rendering the dirty tile. If a given dirty tile was already cached, it is deleted from the cache and then regenerated. If a given dirty tile was not already cached, no deletion is necessary. FIG. 8 illustrates how one particular embodiment of the method 600C can be performed.

FIG. 7 illustrates one embodiment of a method 700 for identifying dirty map tiles. The method 700 may be performed by the dirty tile calculator logic 173 of FIGS. 3 and 5. The method 700 may be performed by a daemon thread on a map server. The method includes, at 710, identifying a set of geometries in the log table. At 720, the method includes determining a base MBR that contains the set of geometries. At 730, the method includes retrieving map tiles in the base MBR for a given zoom level. At 740, the method includes identifying, within the base MBR, MBRs for map tiles in the zoom level that that include a geometry in the set of geometries. The method may also include changing a status in the log table for the geometry to reflect that the geometry is being processed. At 750, a determination is made as to whether another geometry remains for which MBRs have not been identified. If a geometry remains, at 755 a next geometry is identified in the set of geometries and the method returns to 740 and MBRs for the geometry are identified.

Once all geometries have been processed at the current zoom level the method continues to 760 where a determination is made as to whether another zoom level remains. If another zoom level remains, at 765 the next zoom level is identified and at 730 the map tiles in the base MBR for the zoom level are retrieved. Once all the zoom layers have been processed, at 770 the method includes storing identified MBRs in a dirty tile MBR table. The method may also include changing a status in the log table for the geometries to reflect that the geometries have been processed.

FIG. 8 illustrates one embodiment of a method 800 for updating dirty map tiles. The method 800 may be performed by the dirty tile update logic 173 of FIGS. 3 and 5. The method 800 may be performed by a daemon thread on a map server. The method includes, at 810, accessing a set of dirty tiles in a dirty tile MBR table. At 820, a determination is made as to whether a dirty map tile remains. As long as a dirty map tile remains, at 830 the method includes generating the map tile. At 840, the generated map tile is stored in a cache.

As can be seen from the foregoing description, to provide automatic updating of a map cache, triggers inherent to a spatial database are used to automatically log modifications to records in a log table. Background processes periodically check the log table to identify dirty map tiles and to update and re-cache the identified map tiles. Because the log table is updated in real time, map tile identification and updating can be performed, possibly piecemeal, by the background processes whenever resources are available. This facilitates keeping cached map tiles up to date without requiring human interaction, a separate staging map server, or unnecessary re-generation of up-to-date map tiles.

Computer Embodiment

Figure 9:
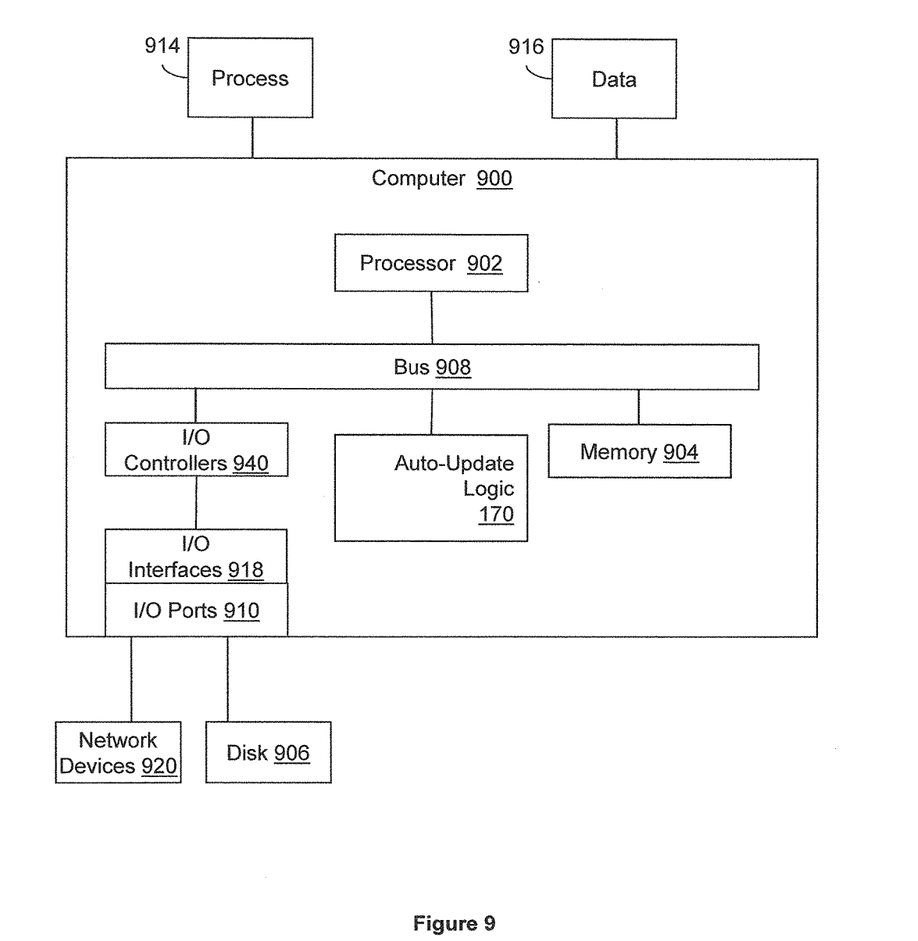
FIG. 9 illustrates an embodiment of a computing system configured with the example systems and/or methods disclosed.

FIG. 9 illustrates an example computing device that is configured and/or programmed with one or more of the example systems and methods described herein, and/or equivalents. The example computing device may be a computer 900 that includes a processor 902, a memory 904, and input/output ports 910 operably connected by a bus 908. In one example, the computer 900 includes the auto-update logic 170 configured to facilitate automatic map cache updating. In different examples, the auto-update logic 170 may be implemented in hardware, a non-transitory computer-readable medium with stored instructions, firmware, and/or combinations thereof. While the auto-update logic 170 is illustrated as a hardware component attached to the bus 908, it is to be appreciated that in one example, the auto-update logic 170 could be implemented in the processor 902.

In one embodiment, the auto-update logic 170 or the computer is a means (e.g., hardware, non-transitory computer-readable medium, firmware) for automatically updating a map cache.

The means may be implemented, for example, as an ASIC programmed to automatically update a map cache. The means may also be implemented as stored computer executable instructions that are presented to computer 900 as data 916 that are temporarily stored in memory 904 and then executed by processor 902.

The auto-update logic 170 may also provide means (e.g., hardware, non-transitory computer-readable medium that stores executable instructions, firmware) for performing the methods described in FIGS. 6, 7, and 8.

Generally describing an example configuration of the computer 900, the processor 902 may be a variety of various processors including dual microprocessor and other multi-processor architectures. A memory 904 may include volatile memory and/or non-volatile memory. Non-volatile memory may include, for example, ROM, PROM, and so on. Volatile memory may include, for example, RAM, SRAM, DRAM, and so on.

A storage disk 906 may be operably connected to the computer 900 via, for example, an input/output interface (e.g., card, device) 918 and an input/output port 910. The disk 906 may be, for example, a magnetic disk drive, a solid state disk drive, a floppy disk drive, a tape drive, a Zip drive, a flash memory card, a memory stick, and so on. Furthermore, the disk 906 may be a CD-ROM drive, a CD-R drive, a CD-RW drive, a DVD ROM, and so on. The memory 904 can store a process 914 and/or a data 916, for example. The disk 906 and/or the memory 904 can store an operating system that controls and allocates resources of the computer 900.

The computer 900 may interact with input/output devices via the i/o interfaces 918 and the input/output ports 910. Input/output devices may be, for example, a keyboard, a microphone, a pointing and selection device, cameras, video cards, displays, the disk 906, the network devices 920, and so on. The input/output ports 910 may include, for example, serial ports, parallel ports, and USB ports.

The computer 900 can operate in a network environment and thus may be connected to the network devices 920 via the i/o interfaces 918, and/or the i/o ports 910. Through the network devices 920, the computer 900 may interact with a network. Through the network, the computer 900 may be logically connected to remote computers. Networks with which the computer 900 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer storage medium storing computer-executable instructions that when executed by a computer cause the computer to perform corresponding functions, where the instructions are configured to cause the computer to:
   detect, in real time, a modification to a spatial database record that includes a geometry, where spatial database records are configured to be viewed as one or more map tiles, further where each map tile comprises a two-dimensional rendering of geometries located within boundaries of the map tile;
   in response to detecting the modification, invoke a trigger to automatically create log records in a log table, wherein the log records identify geometries in a spatial database that were modified and define the modified geometries to be included in the one or more map tiles;
   periodically access the log table as a first background process, independently of a process of detecting the modification and recording the geometry in the log table using the trigger, to retrieve log records and identify dirty map tiles to be updated with the modified geometries defined by the log records;
   periodically generate updated map tiles to replace the dirty map tiles, wherein the updated map tiles are generated to include the updates identified by the log records in the log table as part of a second background process that is performed independently of the first background process, wherein the first background process and the second background process are performed based on an availability of computational resources to be utilized to perform the first background process and the second background process; and
   store the updated map tiles in a cache to replace the dirty tiles, wherein the cache is accessible by a remote computing device via a computer network.

2. The non-transitory computer storage medium of claim 1, wherein the trigger is invoked to populate the log table in response to execution of an UPDATE, INSERT, or DELETE operation on a record in the spatial database.

3. The non-transitory computer storage medium of claim 1, where the instructions are configured to cause the computer to record, in the log table, i) an old version of the geometry corresponding to the record before the modification and ii) a new version of the geometry corresponding to the record after the modification.

4. The non-transitory computer storage medium of claim 1, where the instructions are configured to cause the computer to periodically identify the dirty map tiles that include at least one geometry of records that have been modified by:
   identifying a set of geometries in the log table;
   determining a base minimum bounding rectangle that contains the set of geometries; and
   identifying, within the base minimum bounding rectangle, minimum bounding rectangles for map tiles in a lowest zoom level that include at least one geometry in of the set of geometries; and
   storing the identified minimum bounding rectangles in a dirty tile table.

5. The non-transitory computer storage medium of claim 4, where the instructions are further configured to cause the computer to:
   identify, within the base minimum bounding rectangle, minimum bounding rectangles for map tiles in a next higher zoom level that include at least one geometry of the set of geometries; and
   store the identified minimum bounding rectangles in the dirty tile table.

6. The non-transitory computer storage medium of claim 4, where the instructions are configured to cause the computer to periodically generate the updated map tiles by:
   identifying a minimum bounding rectangle for a map tile in the dirty tile table; and
   generating the updated map tile.

7. A computing system, comprising:
   at least one processor;
   tile generating logic stored on a non-transitory computer readable medium and including instructions that when executed by the at least one processor cause the at least one processor to generate map tiles from records that include a geometry, where the records are stored in a spatial database and are configured to be viewed as one or more map tiles, where each map tile comprises a two-dimensional rendering of geometries located within boundaries of the map tile; and
   auto-update logic stored on the non-transitory computer readable medium and including instructions that when executed by the at least one processor cause the at least one processor to:
      periodically access a log table that includes log records that were created by invoking a trigger to record, in real time, geometries of log records that have been modified, wherein the log table is periodically accessed as a first background process, independently of a process of creating the log records in the log table, to retrieve the log records;
      based on the log records retrieved from the log table, identify dirty map tiles to be updated that include at least one of the modified geometries of the log records recorded in the log table;

periodically cause the tile generating logic to generate, as part of a second background process, updated map tiles to replace the dirty map tiles, wherein the updated map tiles include the modified geometries of the log records, and wherein the first background process and the second background process are performed based on an availability of computational resources to be utilized to perform the first background process and the second background process; and store the updated map tiles in a map cache to replace the dirty tiles, wherein the map cache is accessible by a remote computing device via a computer network.

8. The computing system of claim 7, wherein the trigger is invoked in response to execution of an UPDATE, INSERT, or DELETE operation on a record in the spatial database.

9. The computing system of claim 7, where the log table records, for each modified record, i) an old version of a geometry included in the modified geometries before the modification and ii) a new version of the modified geometry in the modified record after the modification.

10. The computing system of claim 7, where the auto-update logic comprises dirty tile calculator logic stored on the non-transitory computer readable medium and including instructions that when executed by the at least one processor cause the at least one processor to periodically identify the dirty map tiles that include at least one geometry of records that have been modified by:

identifying a set of geometries in the log table;

determining a base minimum bounding rectangle that contains the set of geometries; and identifying, within the base minimum bounding rectangle, minimum bounding rectangles for map tiles in a lowest zoom level that include at least one geometry in the set of geometries; and storing the identified minimum bounding rectangles in a dirty tile table.

11. The computing system of claim 10, where the dirty tile calculator logic is stored on the non-transitory computer readable medium and includes instructions that when executed by the at least one processor cause the at least one processor to:

identify, in a next higher zoom level, within the base minimum bounding rectangle, minimum bounding rectangles for map tiles that include at least one geometry in the set of geometries; and store the identified minimum bounding rectangles in the dirty tile table.

12. The computing system of claim 11, where the dirty tile calculator logic comprises a daemon thread operating on a map server that hosts the auto-update logic and the map cache.

13. The computing system of claim 10, where the auto-update logic comprises dirty tile update logic including instructions that when executed by the at least one processor cause the at least one processor to:

identify a minimum bounding rectangle for a map tile in the dirty tile table; and cause the rending logic to generate the updated map tile.

14. The computing system of claim 13, where the dirty tile update logic comprises a daemon thread operating on a map server that hosts the auto-update logic and the map cache.

15. A computer-implemented method performed by a computing device where the computing device includes at least a processor for executing instructions from a memory, comprising:

detecting, in real time via at least the processor, a modification to a spatial database record that includes a geometry, where spatial database records in a spatial database are configured to be viewed as one or more map tiles, further where each map tile comprises a two-dimensional rendering of geometries located within boundaries of the map tile;

in response to the detecting, invoking a trigger to automatically create log records in a log table, wherein the log records define geometries in the spatial database that were modified via at least the processor, wherein the modified geometries defined in the log records are to be included in the one or more map tiles;

periodically accessing the log table as a first background process, via at least the processor and independently of a process of detecting the modification and recording the geometry in the log table using the trigger, to retrieve log records and identify dirty map tiles to be updated with the modified geometries defined in the log records;

periodically generating updated map tiles identified based on the log records in the log table as part of an update process that is performed as a second background process via at least the processor, wherein the update process is performed independently of the background process of the first background process of periodically accessing the log table, and wherein the first background process and the second background process are performed based on an availability of computational resources to be utilized to perform the first background process and the second background process; and storing, via at least the processor, the updated map tiles in a cache to replace the dirty tiles, wherein the cache is accessible by a remote computing device via a computer network.

16. The computer-implemented method of claim 15, wherein the trigger is invoked to populate the log table in response to execution of an UPDATE, INSERT, or DELETE operation on a record in the spatial database.

17. The computer-implemented method of claim 15, further comprising recording, in the log table, for each modified record: i) an old version of the modified geometry corresponding to the modified record before the modification and ii) a new version of the modified geometry corresponding to the modified record after the modification.

18. The computer-implemented method of claim 15, further comprising periodically identifying the dirty map tiles that include at least one geometry of records that have been modified by:

identifying a set of geometries in the log table;

determining a base minimum bounding rectangle that contains the set of geometries; and identifying, within the base minimum bounding rectangle, minimum bounding rectangles for map tiles in a lowest zoom level that that include at least one geometry in the set of geometries; and storing the identified minimum bounding rectangles in a dirty tile table.

19. The computer-implemented method of claim 18, further comprising:

identifying, in a next higher zoom level, minimum bounding rectangles for map tiles that that include at least one geometry in the set of geometries; and storing the identified minimum bounding rectangles in the dirty tile table.

20. The computer-implemented method of claim 18, further comprising periodically generating the identified map tiles by:
identifying a minimum bounding rectangle for a map tile in the dirty tile table; and
generating the map tile.

* * * * *

UNITED STATES PATENT AND TRADEMARK OFFICE
CERTIFICATE OF CORRECTION

PATENT NO. : 10,042,863 B2
APPLICATION NO. : 14/288460
DATED : August 7, 2018
INVENTOR(S) : Zhu et al.

Page 1 of 1

It is certified that error appears in the above-identified patent and that said Letters Patent is hereby corrected as shown below:

In the Specification

In Column 8, Line 21, delete "that that" and insert -- that --, therefor.

In the Claims

In Column 12, Line 25, in Claim 4, delete "in of the" and insert -- of the --, therefor.

In Column 14, Line 59, in Claim 18, delete "that that" and insert -- that --, therefor.

In Column 14, Line 66, in Claim 19, delete "that that" and insert -- that --, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*